United States Patent [19]

Yokokawa

[11] Patent Number: 4,830,026

[45] Date of Patent: May 16, 1989

[54] ASH TRAY APPARATUS WITH CIGARETTE LIGHTER FOR AUTOMOTIVE VEHICLE

[75] Inventor: Kazunori Yokokawa, Kanagawa, Japan

[73] Assignee: Nissan Motor Co., Ltd., Yokohama, Japan

[21] Appl. No.: 116,881

[22] Filed: Nov. 5, 1987

[30] Foreign Application Priority Data

Nov. 11, 1986 [JP] Japan .................. 61-173888[U]

[51] Int. Cl.⁴ .......................................... A24F 19/10
[52] U.S. Cl. .................... 131/231; 131/234; 131/238
[58] Field of Search ............ 131/231, 238, 235.1, 131/237, 234

[56] References Cited

FOREIGN PATENT DOCUMENTS 60-68996  5/1985  Japan .
60-68997  5/1985  Japan .

*Primary Examiner*—V. Millin
*Assistant Examiner*—D. Crosby
*Attorney, Agent, or Firm*—Foley & Lardner, Schwartz, Jeffery, Schwaab, Mack, Blumenthal & Evans

[57] ABSTRACT

In an ash tray apparatus provided with a cigarette lighter, the ash tray is pivoted open downward and the lighter is slided open frontward side by side, thus providing an easy access of the user to the cigarette lighter when the ash tray is completely open. The apparatus comprises, in particular, a front pin fixed to the ash tray; a rear pin fixed to the cigarette lighter and guided along a slot formed in a partition of the housing; and a link member having a front end connected the front pin and a rear end connected to the rear pin.

6 Claims, 6 Drawing Sheets

F I G. 3
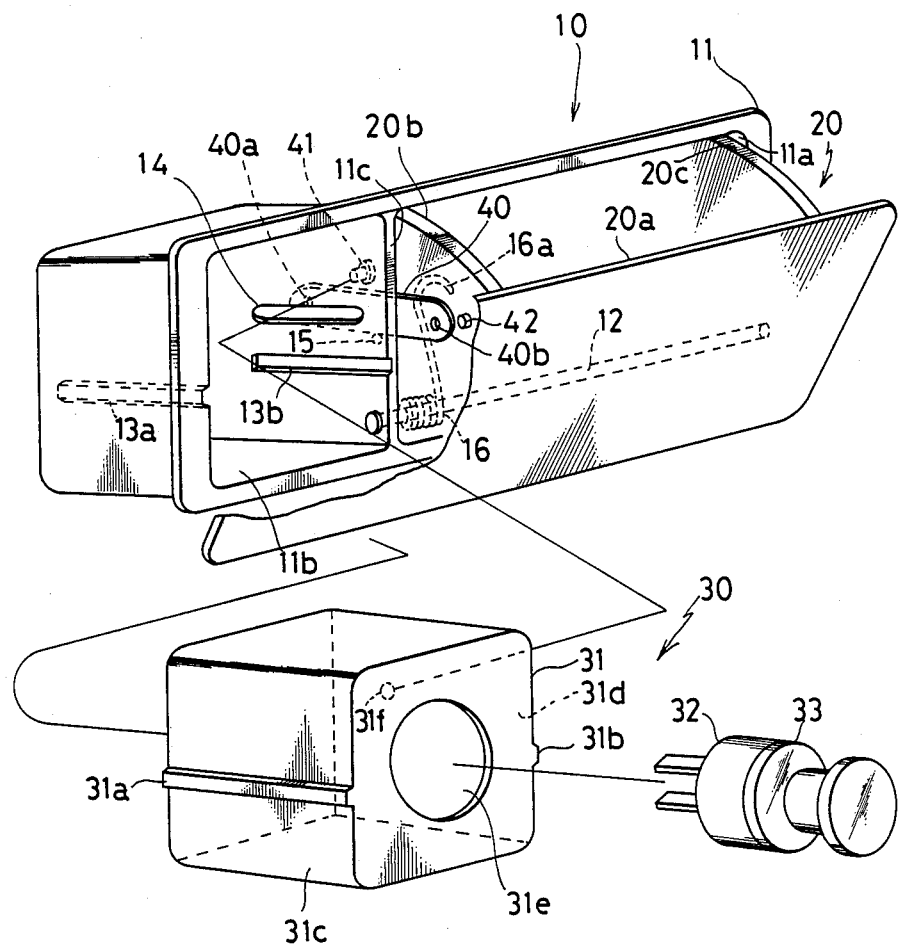

ASH TRAY APPARATUS WITH CIGARETTE LIGHTER FOR AUTOMOTIVE VEHICLE

BACKGROUND OF THE INVENTION

1. Field of the Invention

The present invention relates to an ash tray apparatus provided with a cigarette lighter suitable for use in an automotive vehicle, and more specifically to an ash tray such that a cigarette lighter can be exposed simultaneously when an ash tray is pulled open from an instrument panel of an automotive vehicle.

2. Description of the Prior Art

In automotive vehicles, smoker's requisites such as an ash tray and a cigarette lighter are usually arranged on an instrument panel of an automotive vehicle. When the cigarette lighter is arranged on the panel surface, this is not preferable from interior design or safety point of view. Therefore, ash tray apparatus provided with a cigarette lighter have been proposed. In these apparatus, when the ash tray is pulled out frontward, the cigarette lighter is also exposed in linkage with ash tray frontward motion.

For example, Japanese Unexamined Published (Kokai) Utility Mode Application No. 60-68996 discloses an ash tray apparatus such that a cigarette lighter is slided out open in straight motion fashion when an ash tray is pulled out straight horizontally. In this apparatus, however, since the ash tray is pulled out straight toward the user, there exists a problem such that it is not easy to handle the lighter exposed near the base end of the pulled-out ash tray, because the user's hand is readily brought into contact with an inner lid of the ash tray or others. In addition, the sufficiently pulled-out ash tray is rather obstructive for the user who wants to use the cigarette lighter.

Further, Japanese Unexamined Published (Kokai) Utility Model Application No. 60-68997 discloses another ash tray apparatus such that a cigarette lighter is pivoted open in rotary motion fashion when an ash tray is pulled out also straight horizontally. However, this apparatus involves the same drawbacks as already explained.

The arrangement of the prior-art ash tray apparatus provided with a cigarette lighter will be described in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide an ash tray apparatus with a cigarette lighter for an automotive vehicle such that a cigarette lighter can be slided open in straight motion fashion when an ash tray is pivoted open in rotary motion fashion in order to sufficiently expose both the ash tray and the cigarette lighter simultaneously side by side and thus to provide an easy user's access to the cigarette lighter.

To achieve the above-mentioned object, an ash tray apparatus with a cigarette lighter for an automotive vehicle according to the present invention comprises: (a) a housing including an ash tray housing and a cigarette lighter housing with a partition formed between the two housings; (b) an ash tray housed within the ash tray housing and pivoted open or closed relative to said housing; (c) a cigarette lighter housed within the cigarette lighter housing and slided open or closed relative to said housing; (d) a front pin fixed to said ash tray; (e) a rear pin fixed to said cigarette lighter and guided along a slot formed in the partition of said hosing; and (f) a link member having a front end connected to said front pin and a rear end connected to said rear pin.

The slot formed in the partition of the housing extends substantially horizontally from rear to front of the partition of the housing. A stopper pin is further fixed to the partition below and before the slot, for locating the link member when the ash tray and cigarette lighter are moved open outward.

In the apparatus of the present invention, the cigarette lighter can be slided out straight, simultaneously when the ash tray is pivoted open. Therefore, the ash tray and the cigarette lighter are both exposed side by side, thus providing an easy access to the cigarette lighter.

BRIEF DESCRIPTION OF THE DRAWINGS

The features and advantages of the ash tray apparatus with a cigarette lighter according to the present invention over the prior art apparatus will be more clearly appreciated from the following description of the preferred embodiments of the invention taken in conjunction with the accompanying drawings in which like reference numerals designate the same or similar elements or sections throughout the figures thereof and in which:

FIG. 3 is a perspective view showing an ash tray apparatus provided with a cigarette lighter according to the present invention;

DETAILED DESCRIPTION OF THE PREFERRED EMBODIMENTS

To facilitate understanding of the present invention, a brief reference will be made to prior-art ash tray apparatus, with reference to the attached drawings.

Figure 1A:
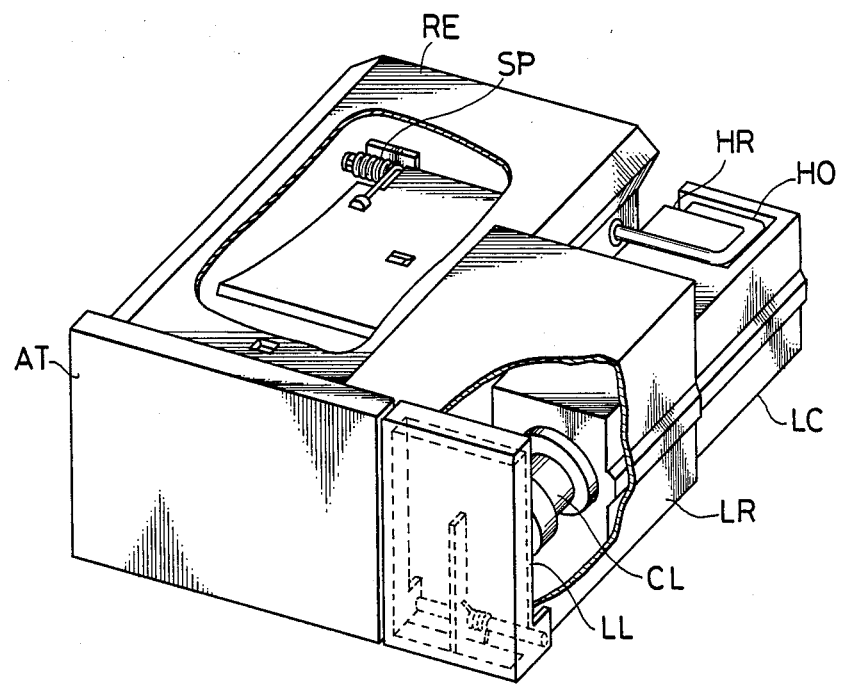
FIG. 1(A) is a perspective view showing a first example of prior-art ash tray apparatus provided with a cigarette lighter, which illustrates the status where the ash tray and the lighter are both kept closed.
Figure 1B:
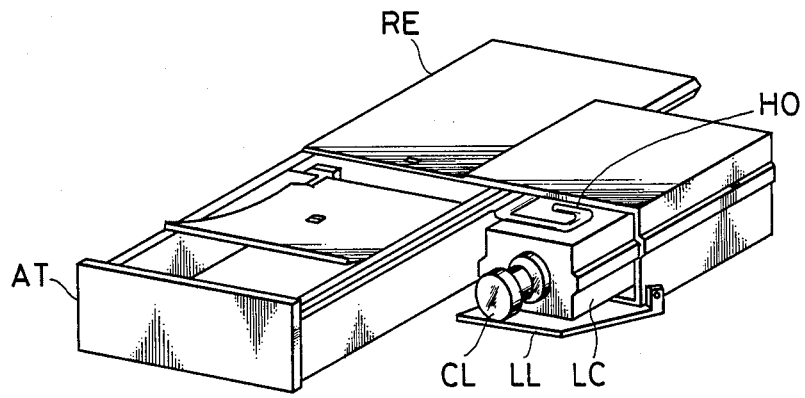
FIG. 1(B) is the same perspective view as in FIG. 1(A), which illustrates the status where both the ash tray and the lighter are both pulled out open.

FIGS. 1(A) and (B) show a first example of prior-art ash tray apparatus with a cigarette lighter, in which FIG. 1(A) illustrates the closed condition and FIG. 1(B) illustrates the open condition.

In the drawings, an ash tray AT is slidably supported by an ash tray retainer RE fixed to an instrument panel (not shown) of a vehicle body. A cigarette lighter CL housed in a lighter case LC is also slidably supported by a lighter retainer LR.

When the ash tray AT is pulled outward, since an L-shaped hook member HO urged by a spring SP clockwise when seen from the rightside in FIG. 1(A) is in engagement with a hook recess HR formed in the lighter case LC, the lighter case LC is also slided outward together with the ash tray AT. In this open movement, a lighter lid LL is pivoted open by the cigarette lighter CL. Further, as depicted in FIG. 1(B), after the lighter case LC has been pulled outward beyond a predetermined distance, since the hook HO is brought out of engagement from the hook recess HR, only the ash tray AT is further pulled open in the frontward direction with cigarette lighter CL remaining at a predetermined position.

The above first example shows a prior-art apparatus in which the ash tray and the cigarette lighter are both slided open along a straight line and only the ash tray is pulled outward beyond the exposed position of the cigarette lighter. The apparatus described above can be derived from the afore-mentioned Application No. 60-68996 hereby incorporated by reference.

Figure 2A:
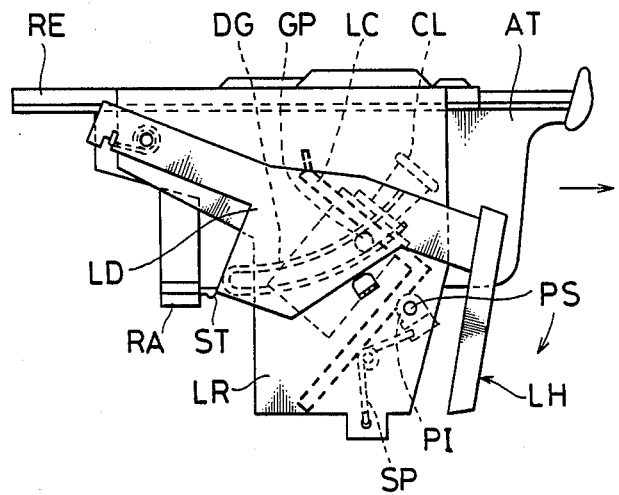
FIG. 2(A) is a side view showing a second example of prior-art ash tray apparatus provided with a cigarette lighter, which illustrates the status where the ash tray and the lighter are both kept closed.
Figure 2B:
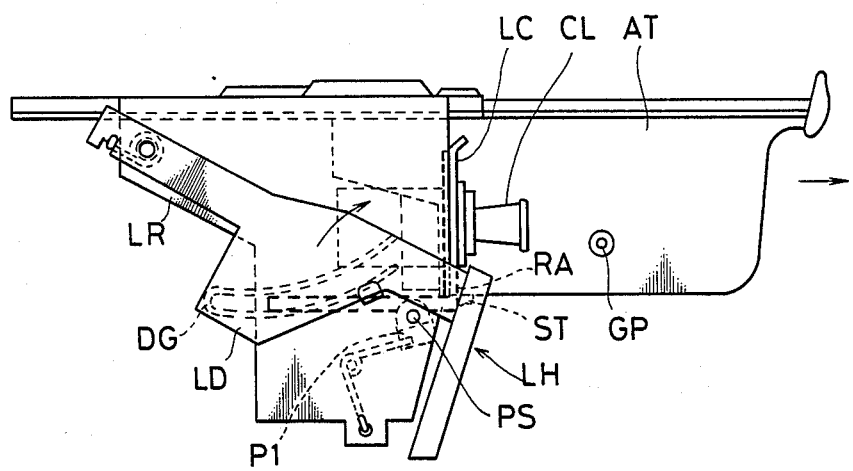
FIG. 2(B) is the same view as in FIG. 1(A), which illustrates the status where the ash tray is pulled open and the cigarette lighter is pivoted open.

FIGS. 2(A) and (B) show a second example of prior-art ash tray apparatus provided with a cigarette lighter, in which FIG. 2(A) illustrates the closed condition and FIG. 1(B) illustrates the open condition.

In the drawings, an ash tray AT is slidably supported by an ash tray retainer RE fixed to an instrument panel (not shown) of a vehicle body. A cigarette lighter CL is supported by a box-shaped lighter retainer LR. A lighter holder LH is composed of an L-shaped lighter cover LC for mounting the cigarette lighter CL (shown by thick dashed lines) and a U-shaped lighter door LD. The lighter cover LC is pivotably supported by a pinion shaft PS and urged counterclockwise by a spring SP.

When the ash tray AT is pulled outward, a guide pin GP fixed to the ash tray AT pivots the lighter door LD clockwise open. When the ash tray AT is further pulled outward, the guide pin GP is removed from the door guide groove DG and a rack RA is brought into contact with a pinion PI to further pivot the lighter cover LC to its completely open position. Thereafter, when the ash tray AT is completely pulled out, a stopper ST is brought into engagement with the pinion shaft PS to lock the lighter cover LC.

The above second example shows a prior-art apparatus in which the ash tray is slided open along a straight line and only the cigarette lighter is pivoted open. In this apparatus, similarly, the ash tray is pulled outward beyond the position of the cigarette lighter pivoted open. The apparatus described above can be derived from the afore-mentioned application No. 60-68997 thereby incorporated by reference.

As described above, in the prior-art ash tray apparatus, since the ash tray is sufficiently slided open beyond the cigarette lighter a little slided or pivoted open, there exists a problem in that the ash tray is obstructive in removing the cigarette lighter, thus preventing user's easy access to the cigarette lighter when the ash tray is completely open.

In view of the above description, reference is now made to a first embodiment of the apparatus of the present invention. The feature of the apparatus is to pivot the ash tray open and simultaneously slide the cigarette lighter outward side by side.

In FIG. 3, the apparatus 10 of the present invention includes a housing 11 including an ash tray housing 11a and a cigarette lighter housing 11b. These two housings 11a and 11b are separated by a partition 11c formed integral with the housing 11. A pivotal shaft 12 is provided at the lower portion of the ash tray housing 11a along the longitudinal direction of the housing 11. A pair of guide grooves 13a and 13b are formed inside the cigarette lighter housing 11b so as to be opposed in parallel to each other. These two guide grooves 13a and 13b extend along both the upper and lower walls of the cigarette lighter housing 11b in the transverse direction of the housing 11 so as to be open at the end surface of the housing 11 as shown. Further, a slot 14 is formed in the partition 11c over the guide groove 13b in parallel thereto. A torsion spring 16 having a hook end 16a at its free end is wound around the pivotal shaft 12.

On the other hand, the apparatus 10 comprises a backet-shaped ash tray 20 and a cigarette lighter 30. A front lid 20a of the ash tray 20 serves also as a lighter lid as well understood in FIG. 3.

The cigarette lighter 30 is composed of a box-shaped lighter casing 31, a lighter holder 32 fitted into the lighter casing 31, and a lighter body 33 removably attached to the lighter holder 32. A pair of straight parallel guide projections 31a and 31b are formed on the side walls 31c and 31d of the casing 31 respectively so as to be slidably engaged with the two guide grooves 13a and 13b formed in the lighter housing 11b. Therefore, when the lighter casing 37 is inserted into the lighter housing 11b with these two projections 31a and 31b engaged with the guide grooves 13a and 13b, the lighter casing 31 is slidably fitted into the lighter housing 11b.

Further, the lighter casing 31 is formed with an aperture 31e to which the lighter holder 32 is fitted on the front surface thereof and with a threaded hole 31f in the side wall 31d thereof.

A plate-like flexible link member 40 is disposed between the partition 11c and the side wall 20b of the ash tray 20. The link member 40 is formed with a reward hole 40a and a frontward hole 40b.

A bolt 41 is inserted into the rearward hole 40a of the link member 40 and then fixed to a threaded hole 31f of the lighter casing 31 in such a way that the bolt (or a pin) 41 is movably guided along the slot 14 formed in the partition 11c. Therefore, when the link member 40 is moved along the slot 14, the lighter casing 31 is also moved along the slot 14. To move the link member 40 by the ash tray 20, an engage pin 42 is fixed to the side wall 20b of the tray 20 and fitted to the frontward hole 40b of the link member 40. That is to say, the ash tray 20 and the lighter casing 30 are linked with each other via the link member 40.

Further, a stopper pin 15 is fixed to the partition 11c between the slot 14 and the guide groove 13b and near the open end surface of the housing 11 so as to extend into the ash tray housing 11a. This pin 15 serves to locate the link member 40 when the ash tray 20 is completely pivoted open.

Figure 4A:
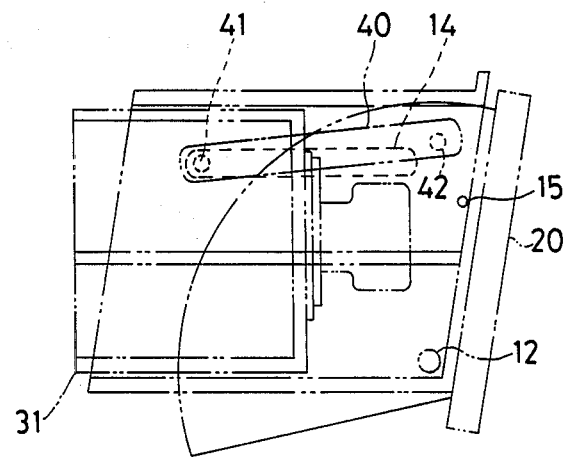
FIG. 4(A) is a side illustrative view showing the same apparatus as in FIG. 3, which illustrates the status where the ash tray and the lighter are both kept closed.

When reference to FIGS. 4(A) and (B), the open-close operation of the ash tray apparatus of the present invention will be described hereinbelow.

Figure 4B:
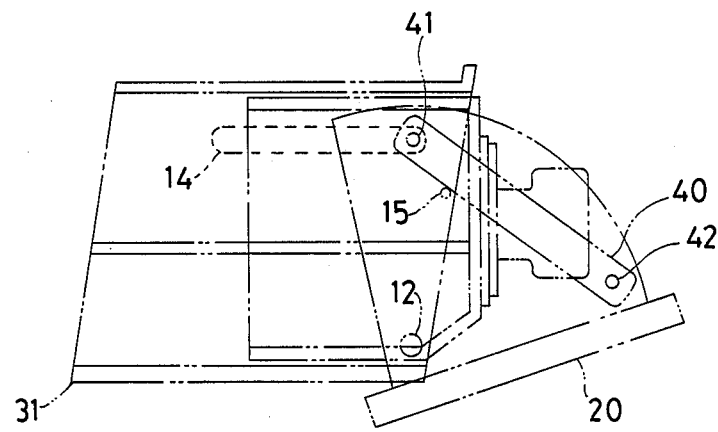
FIG. 4(B) is the same side view as in FIG. 4(A), which illustrates the status where the ash tray is pivoted open and the cigarette lighter is slided open.

When the ash tray 20 is pivoted open frontward around the pivotal shaft 12, since the ash tray 20 is linked with the lighter casing 31 via the flexible link member 40 (the ash tray 20 is connected to the frontward hole 40b of the link 40 via the pin 42, while the lighter casing 30 is connected to the rearward hole 40a of the link 40 via the bolt 41), the lighter casing 31 is slided horizontally frontward by the ash tray 20 via the link 40. When the bolt 41 is brought into contact with the front end of the slot 14 and the link member 40 is brought into contact with the stopper pin 15, the lighter casing 31 is completely slided open and the ash tray 20 is also completely pivoted open as shown in FIG. 4(B). In the same way, when the ash tray 20 is pivoted closed rearward around the pivotal shaft 12, the lighter casing 31 is slided horizontally rearward by the pivotal motion of the ash tray 20 via the link 40. When the bolt 41 is brought into contact with the rearward end of the slot 14, the lighter casing 31 is completely slided closed and the ash tray 20 is completely pivoted closed as shown in FIG. 4(A).

Figure 5A:
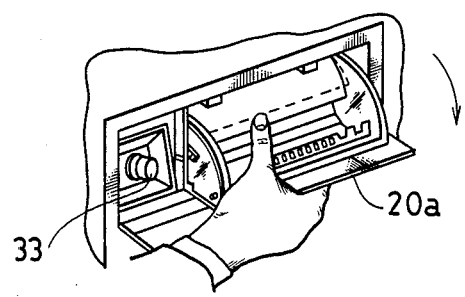
FIG. 5(A) is a perspective view of the same apparatus as in FIG. 3, for assistance in explaining the removal operation of the ash tray apparatus of the present invention from the instrument panel.

With reference to FIGS. 5(A) and (B), the removal and installation of the ash tray apparatus from and to an instrument panel will be described. In the drawings, an engage cutout 21 is formed in two side walls 20b of the ash tray 20, respectively, at the lower and rearward end thereof so as to be engaged with the pivotal shaft 12. When these engage cutouts are engaged with the pivotal shaft 12, the ash tray 20 is pivotable around the shaft 12. A curved protector cover 22 is pivotably attached to an inner wall 20c of the ash tray 20. A pair of hooks 23 are formed at the end of the protector cover 22 so as to be engaged with two stopper members (not shown) attached at the upper wall of the ash tray housing 11a. The protector cover 22 is urged to the inside of the housing 11 by a spring (not shown).

When the ash tray 20 is pushed into the ash tray housing 11a with the engage cutouts 21 engaged with the pivotal shaft 12, the hooks 23 are urged inward beyond the stopper members (not shown) attached at the upper wall of the ash tray housing 11a, so that the ash tray 20 is retained within the housing 11a. After the ash tray 20 has been pushed into the housing 11a, the free end 16a of the torsion spring 16 is engaged with a recess 20d formed in the inner wall 20c of the tray 20 to urge the ash tray 20 inward.

The removal and installation operation of the apparatus will be described hereinbelow.

Figure 5B:
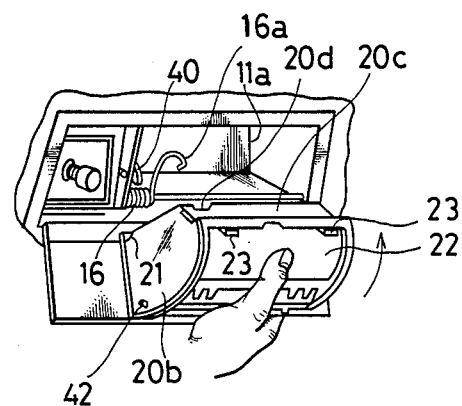
FIG. 5(B) is a perspective view of the same apparatus as in FIG. 3, for assistance in explaining the installation operation of the ash tray apparatus of the present invention to the instrument panel.

After the ash tray 20 has been pivoted open, when the flexible link member 40 is deformed away from the ash tray 20 to disengage the frontward hole 40b of the link member 40 from the engage pin 42, the ash tray 20 can be further pulled outward. After the hooks 23 of the protector cover 22 are brought into contact with the stopper members (not shown) attached at the upper wall of the ash tray housing 11a, the free end of the protector cover 22 is pushed downward to dislocate the hooks 23 away from the stopper members (not shown), thus the ash tray 20 being removed form the ash tray housing 11a as shown in FIG. 5(B).

To install be ash tray apparatus again on the instrument panel. The cutouts 21 of the side walls 20b of the ash tray 20 are engaged with the pivotal shaft 12, and then the free end 16a of the spring 16 is engaged with the recess 20d of the inner wall 20c of the tray 20, before closing the front lid 20a of the ash tray 20.

In the above removal and installation operation, since the link member 40 is brought into contact with the stopper pin 15 fixed on the partition 11c as depicted in FIG. 4(B), one end of the link member 40 is exposed away from the ash tray housing 11a, so that it is possible to easily engage or disengage the engage pin 42 with or from the frontward engage hole 40b of the link member 40.

Figure 6:
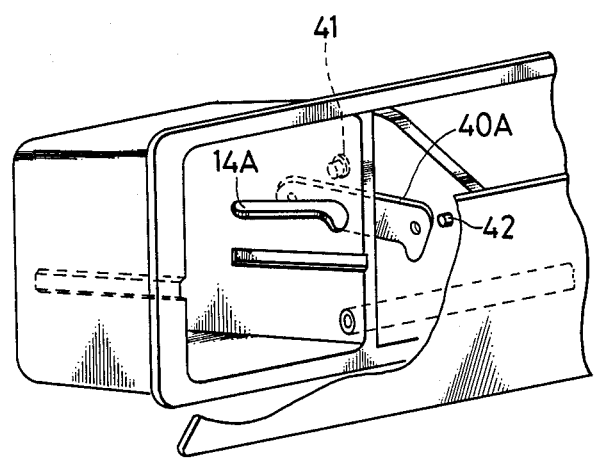
FIG. 6 is a perspective view showing another embodiment of the ash tray apparatus provided with a cigarette lighter according to the present invention.

FIG. 6 shows a second embodiment of the apparatus of the present invention. The slot 14A is formed with a lug-shaped cutout at the frontward end thereof, so that the bolt 41 is stably located at the frontward end of the slot 14A, that is at the open position. This click operation of the slot provides a more stable open condition of the apparatus. In closing the apparatus, a little stronger closing force may be required.

Further, the link member 40A is formed with a lug-shaped projection also at the frontward end of the link member 40A, so that the flexible link member 40A is more readily deformed away from the engage pin 42 when the user touches the link member 40A at this broad lug projection.

As described above, in the ash tray apparatus of the present invention, since the ash tray is pivoted open around the pivotal shaft and the lighter casing is slided open along two guide members and further the ash tray and the lighter casing are linked via the link member, it is possible to slide the lighter casing sufficiently outward simultaneously when the ash tray is being pivoted open. Further, since the ash tray is pivoted open and the cigarette lighter is sufficiently slided open, the exposed ash tray is not obstructive to the user's access to the cigarette lighter.

What is claimed is:

1. An ash tray apparatus provided with a cigarette lighter, comprising:
    (a) a housing including an ash tray housing and a cigarette lighter housing with a partition formed between the two housings;
    (b) an ash tray housed within the ash tray housing and pivoted open or closed relative to said housing;
    (c) a cigarette lighter housed within the cigarette lighter housing and slided open or closed relative to said housing;
    (d) a front pin fixed to said ash tray;
    (e) a rear pin fixed to said cigarette lighter and guided along a slot formed in the partition of said housing; and
    (f) a link member having a front end connected to said front pin and a rear end connected to said rear pin.

2. The ash tray of claim 1, wherein the slot formed in the partition of said housing extends substantially horizontally from rear to front of the partition of said housing.

3. The ash tray of claim 1, which further comprises a stopper pin fixed to the partition below and before the slot, for locating said link member when said ash tray and cigarette lighter are moved open outward.

4. The ash tray of claim 1, wherein a lug-shaped cutout is formed at a front end of the slot to stabilize an open position of said ash tray.

5. The ash tray of claim 1, wherein said link member is bendable so as to be disengaged from the front pin before removal of said ash tray from said housing.

6. The ash tray of claim 5, wherein said link member is formed with a lug-shaped front end projection to facilitate disengagement of said link member from said front pin.

* * * * *